(12) United States Patent
Delaye et al.

(10) Patent No.: US 9,460,253 B1
(45) Date of Patent: Oct. 4, 2016

(54) SELECTING PREDEFINED CIRCUIT IMPLEMENTATIONS IN A CIRCUIT DESIGN SYSTEM

(71) Applicant: Xilinx, Inc., San Jose, CA (US)

(72) Inventors: Elliott Delaye, San Jose, CA (US); Ashish Sirasao, San Jose, CA (US); Krishna Garlapati, Los Gatos, CA (US); Bing Tian, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/482,945

(22) Filed: Sep. 10, 2014

(51) Int. Cl.
  *G06F 17/50* (2006.01)

(52) U.S. Cl.
  CPC ......... *G06F 17/505* (2013.01); *G06F 17/5054* (2013.01); *G06F 2217/08* (2013.01); *G06F 2217/64* (2013.01); *G06F 2217/66* (2013.01)

(58) Field of Classification Search
  USPC .................................................. 716/104, 105
  See application file for complete search history.

(56) References Cited

U.S. PATENT DOCUMENTS

| | | | |
|---|---|---|---|
| 6,769,101 B2* | 7/2004 | Stong | 716/106 |
| 7,017,043 B1* | 3/2006 | Potkonjak | G06T 1/0021 |
| | | | 713/176 |
| 7,370,302 B1* | 5/2008 | Knol et al. | 716/105 |
| 7,490,312 B1* | 2/2009 | Ochotta et al. | 716/125 |
| 8,667,436 B1* | 3/2014 | Garlapati et al. | 716/103 |
| 8,694,302 B1* | 4/2014 | Ho | 703/14 |
| 8,751,983 B1* | 6/2014 | Mitchell et al. | 716/105 |
| 2007/0245281 A1* | 10/2007 | Riepe et al. | 716/9 |
| 2012/0151431 A1* | 6/2012 | Huijbregts et al. | 716/131 |
| 2014/0157216 A1* | 6/2014 | Pandey | G06F 17/504 |
| | | | 716/106 |

* cited by examiner

*Primary Examiner* — Brian Ngo
(74) *Attorney, Agent, or Firm* — Robert M. Brush

(57) ABSTRACT

In an example, a method of processing a circuit design includes: determining a first partition in a description of the circuit design having a hierarchy of design objects, the first partition including at least one design object in the hierarchy of design objects; generating a signature for the first partition; querying a database with the signature of the first partition to identify a plurality of predefined implementations of the first partition; and generating an implementation of the circuit design for a target integrated circuit (IC) based on a selected predefined implementation of the plurality of predefined implementations for the first partition.

19 Claims, 7 Drawing Sheets

SELECTING PREDEFINED CIRCUIT IMPLEMENTATIONS IN A CIRCUIT DESIGN SYSTEM

TECHNICAL FIELD

Examples of the present disclosure generally relate to electronic circuit design and, in particular, to selecting predefined circuit implementations in a circuit design system.

BACKGROUND

Circuit designs for integrated circuits (ICs) can be generated using a variety of techniques. In some examples, designers can write register-transfer level (RTL) code, write program-language code, create schematic representations, or a combination thereof to design a circuit for implementation in a target IC device. The target IC device can be a programmable IC, such as a field programmable gate array (FPGA), a mask-programmable IC, such as an application specific integrated circuit (ASIC), or the like. In the design flow, a designer creates a description of the circuit design, which is then processed through one or more steps that transform the description into a physical implementation of the circuit design for a target IC device.

In some design flows, each time a user changes a circuit design, the user must restart the implementation of the modified circuit design from the beginning. Other design flows attempt to reuse a previous implementation to "seed" a new implementation. The seed or guidance, however, is often not reliable and the design flow can actually take longer to implement the changed circuit design than it would otherwise. Still other design flows allow a user to manually divide the design into different portions, and then attempt to reuse implemented portions in subsequent implementations of the circuit design. Manual design partitioning exhibits higher flow complexity. Moreover, such design flows lack strong isolation of circuit blocks, and thus incremental changes in one circuit block can cascade throughout the circuit design. The propagation of incremental changes throughout the circuit design leads to nearly complete or complete re-implementation of the circuit design.

SUMMARY

Selecting predefined circuit implementations in a circuit design system is described. In an example, a method of processing a circuit design includes: determining a first partition in a description of the circuit design having a hierarchy of design objects, the first partition including at least one design object in the hierarchy of design objects; generating a signature for the first partition; querying a database with the signature of the first partition to identify a plurality of predefined implementations of the first partition; and generating an implementation of the circuit design for a target integrated circuit (IC) based on a selected predefined implementation of the plurality of predefined implementations for the first partition.

In another example, a non-transitory computer readable medium includes instructions, which when executed in a computer system, causes the computer system to carry out a method of processing a circuit design including: determining a first partition in a description of the circuit design having a hierarchy of design objects, the first partition including at least one design object in the hierarchy of design objects; generating a signature for the first partition; querying a database with the signature of the first partition to identify a plurality of predefined implementations of the first partition; and generating an implementation of the circuit design for a target integrated circuit (IC) based on a selected predefined implementation of the plurality of predefined implementations for the first partition.

In another example, a computer system including a circuit design tool executing therein to process a circuit design includes a memory and a processor. The memory stores a database having predefined implementations associated with signatures. The processor executes the circuit design tool and is programmed to: determine a first partition in a description of the circuit design having a hierarchy of design objects, the first partition including at least one design object in the hierarchy of design objects; generate a signature for the first partition; query the database with the signature of the first partition to identify a plurality of predefined implementations of the first partition; and generate an implementation of the circuit design for a target integrated circuit (IC) based on a selected predefined implementation of the plurality of predefined implementations for the first partition.

These and other aspects can be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
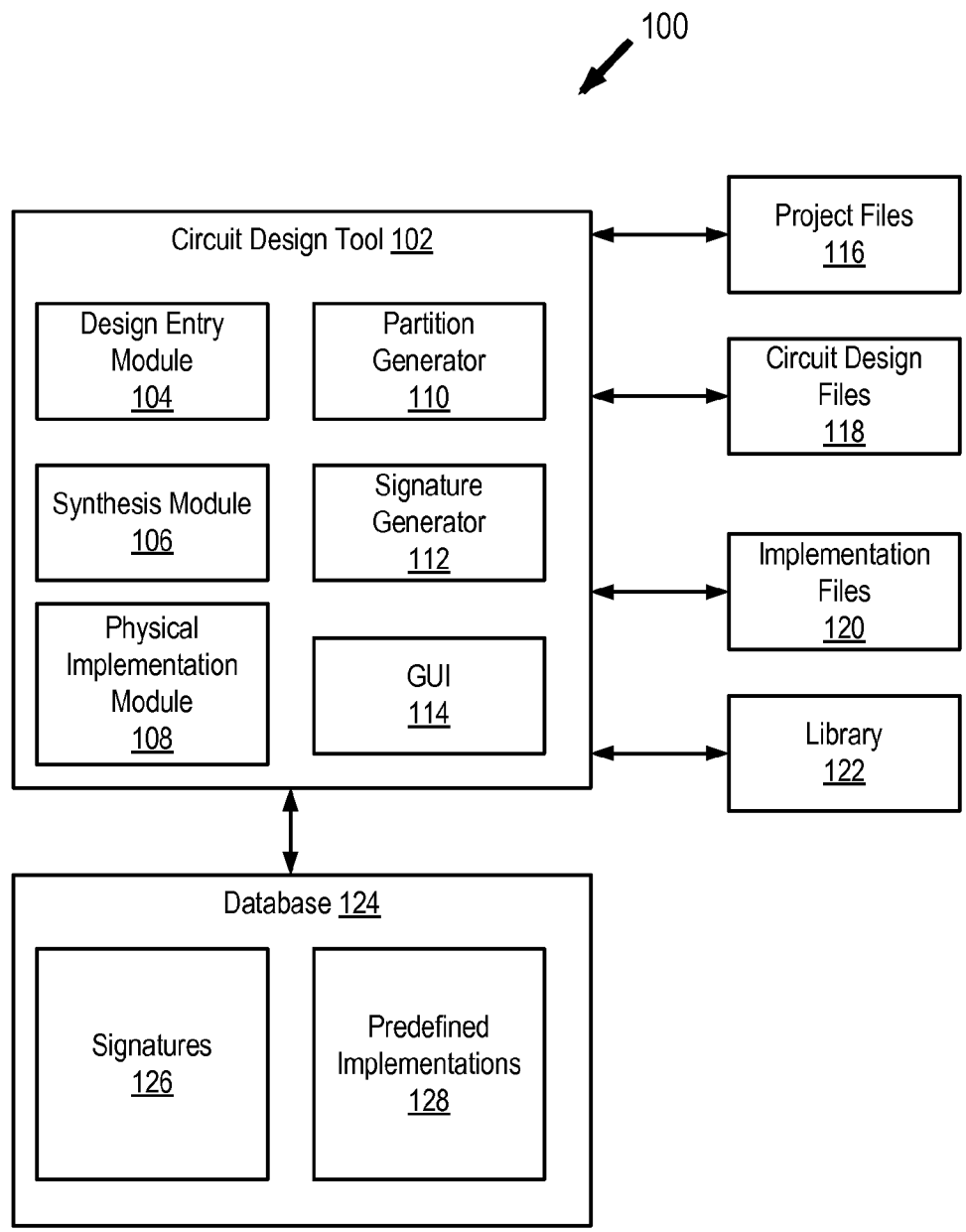
FIG. 1 is a block diagram depicting an example circuit design system.

Selecting predefined circuit implementations in a circuit design system is described. In general, the circuit design system provides a design flow through which a user can generate and implement a circuit design for a target integrated circuit (IC). The circuit design generally includes a hierarchy of design objects. In an example, the circuit design system provides a design flow that includes automatically determining partitions in a description of the circuit design, generating unique signatures for the partitions, and identifying and using predefined implementations of the partitions. Each of the partitions includes at least one design object in the hierarchy that satisfies some established criteria. For example, the partitions can be based on frequency of use, importance, complexity, and/or dependency of the corresponding design object(s), rather than based on a user's modules. The circuit design system implements the partitions independently to generate an overall implementation of the circuit design for the target IC. In general, a user invokes one or more cycles of the design flow. For example, a user can change a given circuit design incrementally and invoke multiple implementation cycles.

During each implementation cycle, the circuit design system generates a unique signature for each partition. The circuit design system queries a database that stores predefined implementations indexed by signatures. A "predefined implementation" can include: (1) an implementation for a partition generated a priori by the user or by a third party during a prior implementation of the current circuit design; (2) an implementation of another circuit design; or (3) a dedicated implementation of the partition. A predefined implementation can have various forms, such as a netlist synthesized in terms of a library of technology elements, a layout for a target IC, and the like.

In general, the circuit design system generates an implementation of the circuit design for a target IC based on a selected predefined implementation from the database for one or more partition(s). The circuit design system can identify a set of predefined implementations for a given partition based on its signature. The set of predefined implementations for a given partition can include multiple implementations that differ in terms of optimization. During an implementation cycle, the circuit design system can select a predefined implementation for a given partition and incorporate the selected predefined implementation into the overall implementation of the circuit design. The circuit design system can select the most optimal predefined implementation based on the target IC, user preference, and the like. In this manner, the circuit design system improves design flow runtime.

Alternatively, the circuit design system can generate a new implementation of a given partition based on a selected predefined implementation. The new implementation can include a different optimization not present in any predefined implementation for the partition. The circuit design system can compare the new implementation with a predefined implementation and determine the most optimal implementation. In this manner, the circuit design system improves the quality of results (QOR) at the expense of longer design flow runtime. The circuit design system can add a new implementation to the set of predefined implementations, allowing the new implementation to be reused in subsequent implementation cycles and improving QOR without an increase in design flow runtime. These and further aspects of the present disclosure are discussed below.

Turning now to the figures, FIG. 1 is a block diagram depicting an example circuit design system 100. The circuit design system 100 includes a circuit design tool 102 having a design entry module 104, a synthesis module 106, a physical implementation module 108, and a graphical user interface (GUI) 114. The circuit design tool 102 can be implemented by circuitry that is part of an electronic system, by firmware in the electronic system, by software in the electronic system, or by a combination thereof. An example electronic system in which the circuit design system 100 can be implemented is described below with respect to FIG. 6.

In general, the circuit design system 100 generates an abstract description of the circuit design, which is processed into a physical description of the circuit design for a particular target IC. The circuit design system 100 can process the abstract description of the circuit design through various intermediate transformations to produce the physical description of the circuit design for a target IC. The physical description of the circuit design can be formatted and loaded into a programmable IC to produce a physical circuit, or used to produce physical masks to form an ASIC or the like. Thus, the circuit design system 100 transforms an abstract representation of the circuit design (the abstract description) into a physical representation of the circuit design (the physical description) that can be formatted to realize a physical circuit in an IC.

A user interacts with the circuit design tool 102 to produce project files 116, circuit design files 118, and implementation files 120. The project files 116 include one or more files specifying project settings for each circuit design. For example, the project files 116 can specify attributes for target hardware of a circuit design, such as a type of IC in the target hardware, a model of the IC, a speed grade of the IC, a number of IO ports of the IC, and the like. The circuit design files 118 include one or more files specifying each circuit design at various levels of abstraction, such as a high-level block model of the circuit design, a lower level hardware description language (HDL) model of the circuit design, or the like. In general, the circuit design files 118 have little or no dependence on the target IC. The circuit design tool 102 processes the circuit design files 118 to generate the implementation files 120. The implementation files 120 include one or more files specifying each circuit design with varying dependence of the target IC. For example, the implementation files 120 can include a netlist synthesized into technology specific elements for a target IC or a layout for the target IC (e.g., a netlist mapped, placed, and routed for a programmable IC).

The design entry module 104 generates a functional description of the circuit design in response to user input through the GUI 114. The functional description can include descriptions for a plurality of circuit components, such as flip-flops, memories, logic gates, processors, and the like, coupled together by connections (referred to as "nets" or "signals"). The functional description can include a register transfer level (RTL) description specified using a circuit design language (e.g., a hardware description language (HDL)) and/or specified schematically. The functional description can include a high-level model description specified using a program language, such as C, C++, JAVA, or the like, and/or specified schematically. The functional description can include a combination of RTL and high-level model descriptions. The GUI 114 can include a graphic interface through which an end user connects symbols and blocks representing various components to produce a schematic of the circuit design. The GUI 114 can include a text interface through which a user writes HDL/program language code. The GUI 114 can employ a combination of schematic and text-based entry. In some examples, the design entry module 104 can access a library 122 having a plurality of circuit components, such as intellectual property (IP) cores and the like. The functional description can be stored in one or more of the circuit design files 118.

The synthesis module 106 produces a logical implementation of the circuit design from the functional description. The logical implementation of the circuit design includes a logical representation of the circuit design in terms of specific logic elements. For example, the synthesis module 106 can perform "technology mapping" that transforms generic circuit elements into technology-specific circuit elements. For example, the logical implementation can include a representation of the circuit design in terms of specific logic elements optimized to the architecture of a programmable IC, such as lookup tables (LUTs), carry logic, IO buffers, and like technology-specific components. In another example, the logical implementation can include a representation of the circuit design in terms of logic gates, flip-flops, and the like. In an example, the logical implementation includes a logical network list ("netlist") supported by an IC of the target hardware. The logical implementation can be stored in one or more of the implementation files 120.

The physical implementation module 108 produces a physical implementation of the circuit design from the logical implementation. The physical implementation of the circuit design is a physical representation of the circuit design for implementation in a target IC. For example, the physical implementation module 108 can map, place, and route the logical implementation for a programmable IC, or layout the logical implementation for an ASIC. The physical implementation can include a bitstream for configuring the programmable IC with a circuit specified by the circuit design. In another example, the physical implementation can include a set of mask definitions for manufacturing an ASIC or the like with the circuit specified by the circuit design. The physical implementation can be stored in one or more of the implementation files 120.

The circuit design tool 102 also includes a partition generator 110. The partition generator 110 determines partitions in a functional description of the circuit design selected from a hierarchy of design objects of the circuit design. The functional description generated by the design entry module 104 generally includes a hierarchy of design objects. A "design object" specifies content describing a circuit (e.g., circuit elements and connections). A design object can include parameters that customize the logic and functionality of the circuit. Thus, the design object can also specify parameter values. For example, a design object can be an RTL description of a counter circuit having a width parameter with a specific value (e.g., 8-bit counter, 16-bit counter, etc.). In general, each design object can be a circuit defined by the user or some circuit selected from the library 122, such as an IP core.

Each partition generated by the partition generator 110 generally includes one or more design objects in the hierarchy of the circuit design. The partition generator 110 can use various criteria in forming the partitions. The partition criteria can be selected based on various partition strategies. For example, the partition generator 110 can define a partition for each design object having a threshold number of instances in the hierarchy of objects. Greater improvement in design flow runtime can be achieved by utilizing predefined implementations for partitions that appear frequently in the circuit design. In another example, the partition generator 110 can define a partition for each IP core design object in the hierarchy of objects. An IP core is a predesigned and tested circuit that more likely to remain unchanged across incremental versions of the circuit design, increasing the likelihood that a predefined implementation can be used in each implementation cycle. In another example, the partition generator 110 can define a partition for each design object having a threshold level of dependence on other design objects. Similar to IP cores, design objects that depend on fewer or no other design objects can be less likely to change across incremental versions of the circuit design. In another example, the partition generator 110 can define a partition for each design object satisfying a threshold size in terms of object content (e.g., the number of constituent circuit elements, connections, parameters, etc.). Greater improvement in design flow runtime can be achieved by utilizing larger partitions that would otherwise provide larger contributions to design flow runtime. The partition generator 110 can use a combination of the above-described criteria. These are but a few examples of criteria and strategies that can be employed by the partition generator 110 to determine partitions in a circuit design. The partition(s) defined by the partition generator 110 do not necessarily include all design objects of the circuit design. Some design object(s) of the circuit design may remain outside of the partition(s).

The circuit design tool 102 also includes a signature generator 112 generates a signature for each partition defined by the partition generator 110. A signature uniquely identifies a given partition. In general, the signature generator 112 creates a representation of a partition based on its content and optional parameter values and generates a unique identifier from the representation. For example, the representation of the content and optional parameter values can be used as input to a hash function, which generates a hash value ("key") to be used as the unique identifier. If a partition includes a parameterized design object, the signature generator 112 must account for the parameter values so that the partition can be distinguished from another partition having the same parameterized design object, but specified with different parameter values. Different parameter values can affect the logic and functionality of a given design object, and hence alter the implementation thereof. In addition, the signature generator 112 accounts for the content of the partition (e.g., RTL code or the like), which will be consistent across circuit designs. Since the predefined implementations can be generated by third parties other than the user, the signature generator 112 should avoid using user-specific and/or circuit design-specific parameters when generating a signature, such as circuit block names, signal names, and the like.

In an example, the signature generator 112 uses a hash function to generate a key to be used as the signature for the partition. The hash function can be reversible or non-reversible. If protection of the predefined implementation is desirable, a non-reversible hash function can be employed, such as a cryptographic hash function. With a reversible hash function, an inverse hash function can be applied given a signature to recover the content and optional parameter values of a given partition.

The circuit design tool 102 is coupled to a database 124. The database 124 includes entries relating signatures 126 to predefined implementations 128. In general, each signature 126 can be associated with a set of predefined implementations comprising one or more implementations. The predefined implementations associated with a given signature can differ in terms of optimization. A given implementation can include one or more optimization parameters, which can depend on the target IC. For example, assume that the target IC is a programmable IC having general-purpose configurable logic blocks (CLBs) with lookup tables (LUTs), as well as special-purpose blocks, such as digital signal processor (DSP) blocks. Assume further that a design object can be implemented for such a target IC using only CLBs (e.g., using 50 LUTs). Other implementations for the design object include use of special-purpose blocks (e.g., using 10 LUTs and 3 DSP blocks, 20 LUTs and 2 DSP blocks, etc.). The configuration of LUTs-to-DSP blocks is merely one example of an optimization parameter. In general, an implementation for a partition can include one or more optimization parameters, and each predefined implementation in the set can include different values for the optimization parameters. While the predefined implementations for a given partition may differ in terms of optimization, the predefined implementations are equivalent in terms of functionality, which is guaranteed by the common signature.

During implementation of a circuit design, the circuit design tool 102 can query the database 124 with the signature of each partition to identify a corresponding set of predefined implementations for each partition. The synthesis module 106 or the physical implementation module 108 can perform the query depending on the type of the predefined implementations stored in the database 124. In an example, the predefined implementations 128 comprise synthesized netlists, and thus the synthesis module 106 performs the query. In another example, the predefined implementations 128 comprise mapped, placed and routed netlists, and thus the physical implementation module 108 performs the query. The circuit design tool 102 then generates an implementation of the circuit design for a target IC based on selected predefined implementation(s) from the database 124. The implementation of the circuit design can be a logical implementation generated by the synthesis module 106, or a physical implementation generated by the physical implementation module 108.

In each implementation cycle, the circuit design tool 102 can generate implementations for some partitions and reuse predefined implementations for other partitions. For example, some partitions may have a signature that is not stored in the database 124 during a given implementation cycle. In such case, the circuit design tool 102 generates a new implementation for the partition. In another example, some partitions may have a signature in the database 124, but the circuit design tool 102 may generate new implementations having different optimizations than any of the predefined implementations stored in the database 124. During a given implementation cycle, the circuit design tool 102 can compare newly generated implementation(s) with existing predefined implementation(s) and select the most optimal implementation, which improves the quality of results. For each implementation cycle, the circuit design tool can store new implementations in the database 124 in associated with corresponding partition signatures.

Figure 2:
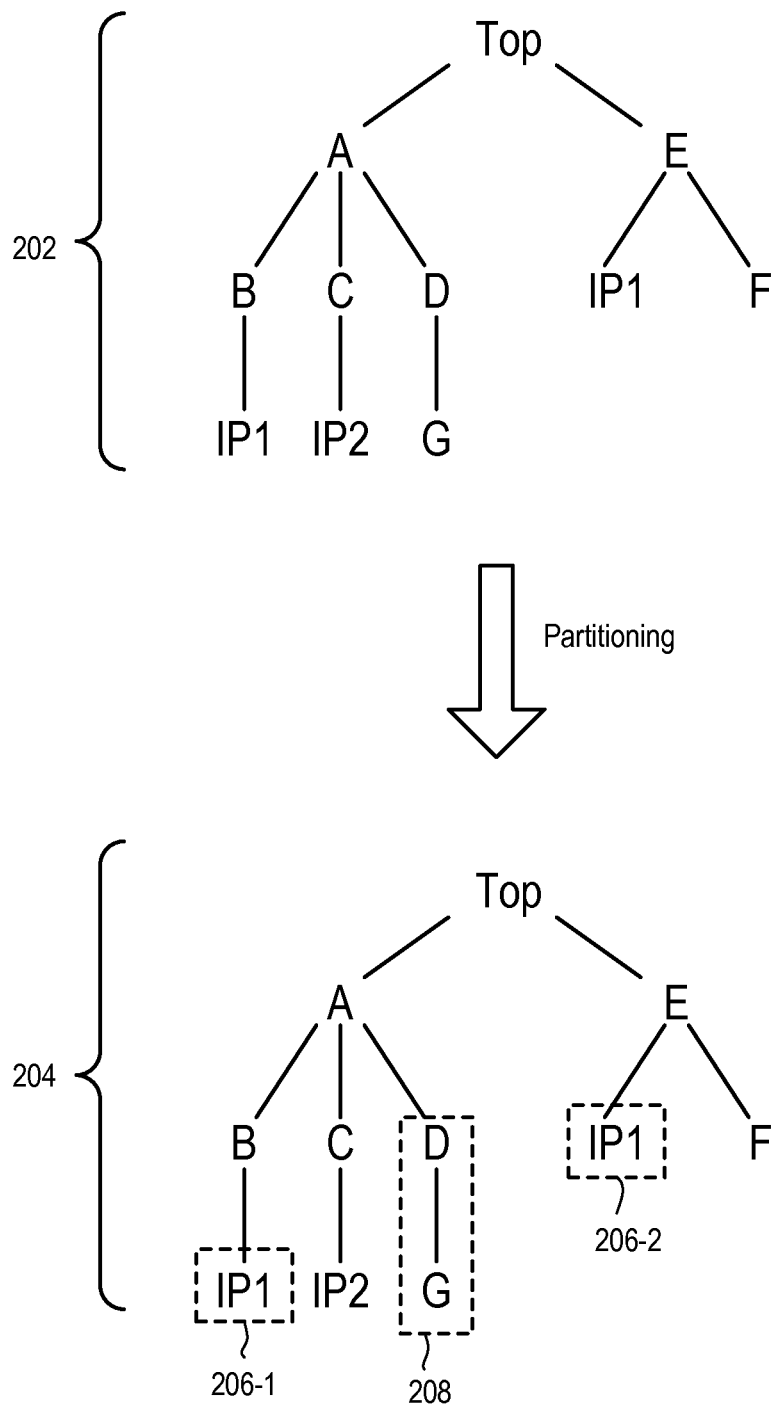
FIG. 2 illustrates a process of generating partitions in an example circuit design.

FIG. 2 illustrates a process of generating partitions in an example circuit design. A circuit design can include a hierarchy 202 of design objects designated "Top", "A" through "G", "IP1", and "IP2". The design object "Top" represents a top-level design object and includes the design objects "A" and "E". The design object "E" includes the design objects "IP1" and "F". The design object "A" includes the design objects "B", "C", and "D". The design object "B" includes the design object "IP1". The design object "C" includes the design object "IP2". The design object "D" includes the design object "G". The design objects designated with a letter can represent design objects created by a user, and the design objects "IP1" and "IP2" can represent IP cores created by the user or a third-party.

A partitioned hierarchy 204 includes two partitions: (1) a first partition including the design object "IP1" that includes two instances 206-1 and 206-2 (generally partition 206); and (2) a second partition 208 including the design objects "D" and "G". The partition generator 110 can select the design object "IP1" to form the partition 206 being that there are two instances of the design object in the circuit design (e.g., "IP1" satisfies a criteria of a threshold number of instances).

The partition generator 110 can select the design objects "D" and "G" to form the partition 208 based on size (e.g., assume "D" and "G" are large circuit blocks meeting a size threshold). Design objects "Top", "A", "B", "C", "E", "F", and "IP2" are not part of any partition (e.g., those design objects don't meet the criteria utilized by the partition generator 110).

Figure 3:
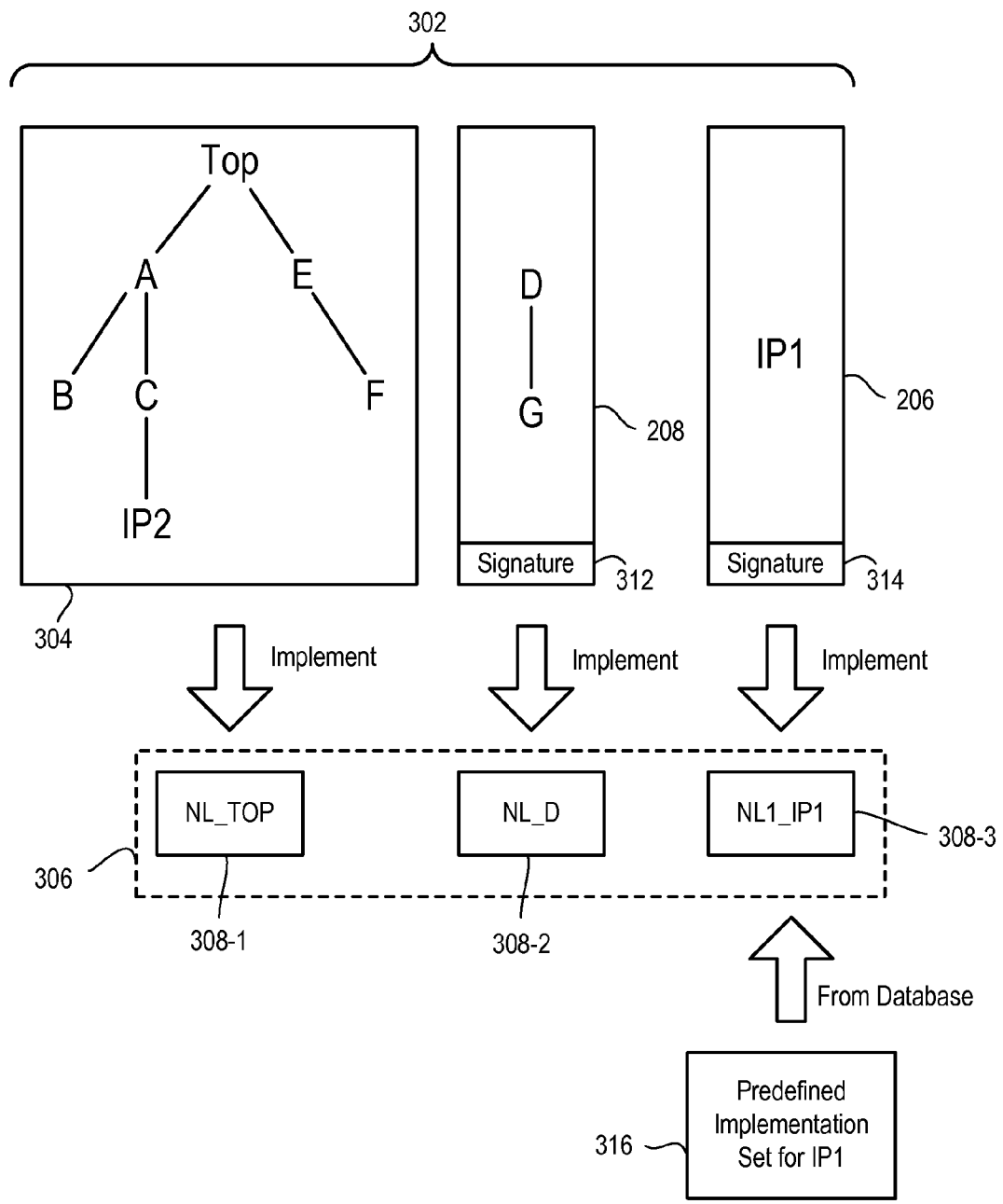
FIG. 3 illustrates an implementation process for the example circuit design of FIG. 2.

FIG. 3 illustrates an implementation process for the example circuit design of FIG. 2. A partitioned circuit design 302 includes the partition 206 having design object "IP1", the partition 208 having the design objects "D" and "G", and a remaining portion 304 having the design objects "Top", "A", "B", "C", "E", "F", and "IP2". The circuit design tool 102 implements the partitioned circuit design 302 by implementing partitions 206 and 208 and portion 304 independently (e.g., either in parallel or in series one after another). The partition 206 includes a signature 314, and the partition 208 includes a signature 312. The signatures 312 and 314 may comprise meta-data stored with the partitions. In the present example, the circuit design tool 102 implements the portion 304 and the partition 208 to produce implementations 308-1 and 308-2, respectively. For example, the signature 312 of the partition 208 may not be stored in the database 124. The signature 314 is stored in the database 124 along with a set of predefined implementations 316 for IP1. The circuit design tool 102 obtains a selected predefined implementation 308-3 from the database 124 for the partition 206. The implementations 308-1 through 308-3 form an implementation 306 of the circuit design. The circuit design hierarchy shown and described with respect to FIGS. 2 and 3 is merely one simplified example of a circuit design.

Figure 4A:
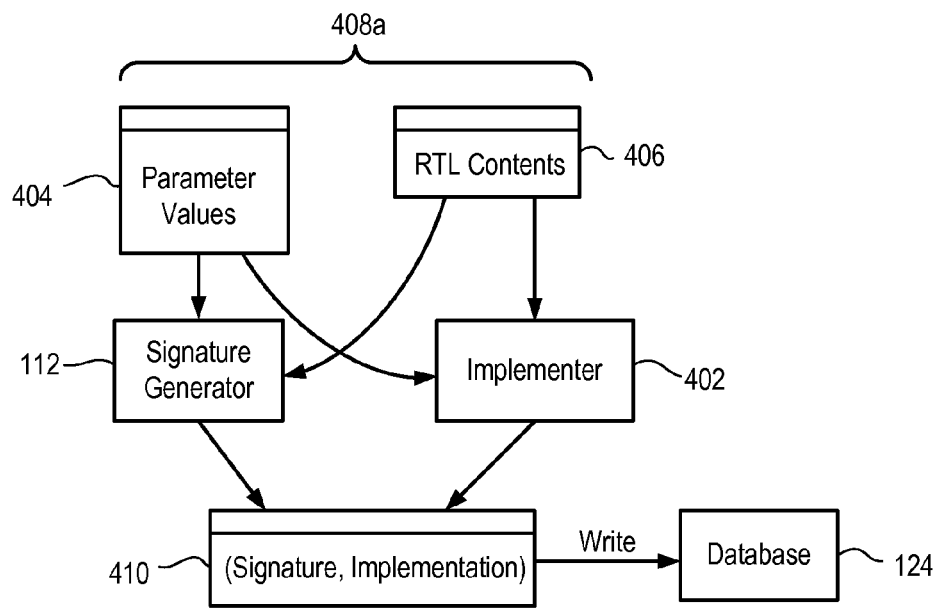
FIG. 4A is a flow diagram depicting an example method of generating and storing an implementation for a partition.

FIG. 4A is a flow diagram depicting an example method of generating and storing an implementation for a partition. A partition 408a includes design object(s) specified by RTL contents 406 and parameter values 404. The RTL contents 406 include an RTL description of the design object(s), and the parameter values 404 include values for parameters of the design object(s). The signature generator 112 generates a signature from the RTL contents 406 and the parameter values 404. An implementer 402 (e.g., synthesis module 106 or physical implementation module 108) implements the partition based on the RTL contents 406 and the parameter values 404 to generate an implementation. An entry 410 relating the signature and implementation is stored in the database 124 via a write transaction. The circuit design tool 102 can perform the method of FIG. 4A for each partition that does not have a signature in the database 124, or for each partition having an optimized implementation not stored in the database 124.

Figure 4B:
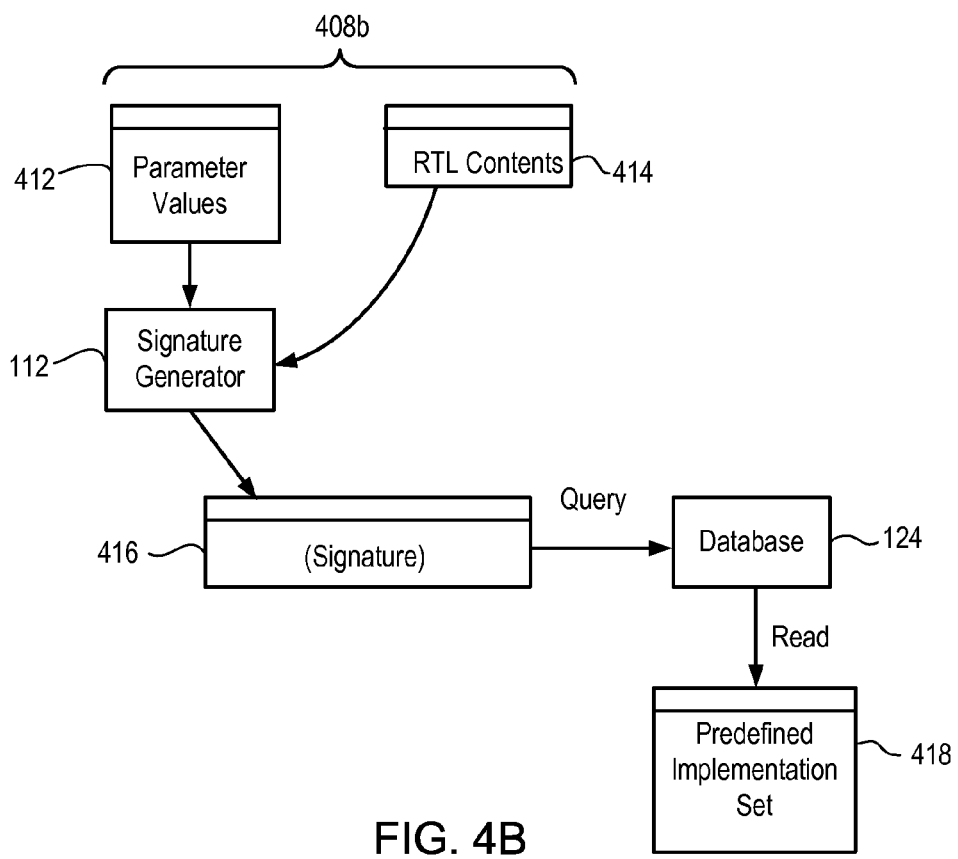
FIG. 4B is a flow diagram depicting an example method of obtaining a predefined implementation for a partition.

FIG. 4B is a flow diagram depicting an example method of obtaining a predefined implementation for a partition. A partition 408b includes design object(s) specified by RTL contents 414 and parameter values 412. The signature generator 112 generates a signature 416 from the RTL contents 414 and the parameter values 412. The circuit design tool 102 uses the signature 416 to query the database 124 to obtain a set of predefined implementations 418 for the partition 408b through a read operation. The circuit design tool can perform the method of FIG. 4B for each partition that has a signature in the database 124.

Figure 5:
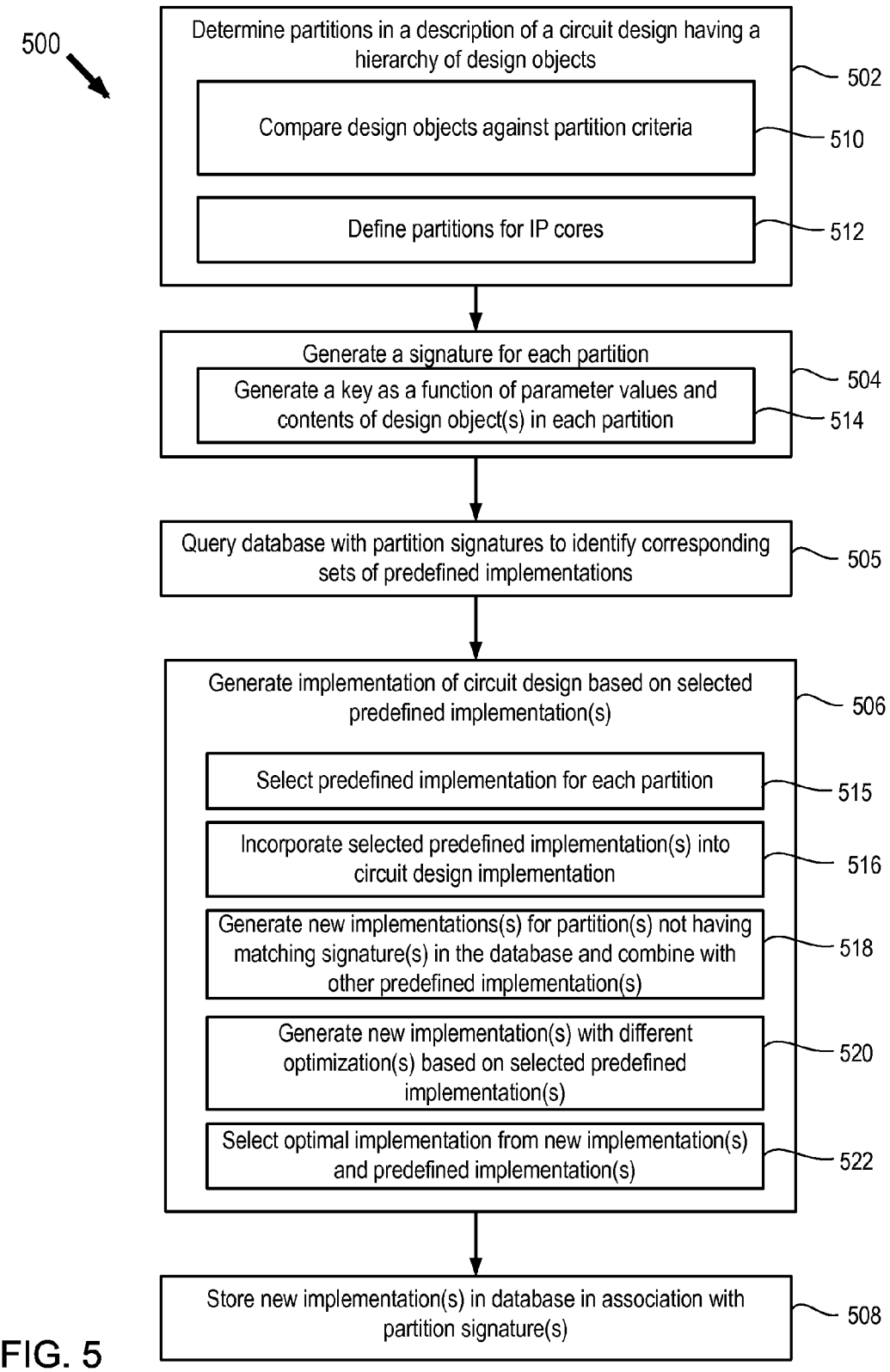
FIG. 5 is a flow diagram depicting an example method of processing a circuit design.

FIG. 5 is a flow diagram depicting an example method 500 of processing a circuit design. The method 500 can be performed by the circuit design tool 102 of FIG. 1. The method 500 begins at step 502, where the circuit design tool 102 determines partitions in a description of the circuit design having a hierarchy of design objects. At step 504, the circuit design tool 102 generates a signature for each partition. At step 505, the circuit design tool 102 queries a database with partition signatures to identify corresponding sets of predefined implementations for the partitions. At step 506, the circuit design tool generates an implementation of the circuit design based on selected predefined implementation(s) of partition(s). At step 508, the circuit design tool 102 stores any new implementation(s) in the database in association with partition signature(s).

In an example, the step 502 can include a step 510, where the circuit design tool 102 compares design objects against partition criteria to determine the partitions. Example partition criteria include a threshold number of instances, a threshold size, a threshold level of dependence, or a combination of such criteria. The step 502 can also include a step 512, where the circuit design tool 102 defines partitions for IP cores in the circuit design (if any).

In an example, the step 504 can include a step 514, where the circuit design tool 102 generates a key as a function of parameter values and contents of design object(s) in each partition. As discussed above, the circuit design tool 102 can use a hash function to generate partition signatures based on a representation of the parameter values and contents of the design object(s).

In an example, the step 506 includes a step 515, where the circuit design tool 102 selects a predefined implementation for each partition from a corresponding set of predefined implementations. For example, the circuit design tool 102 can select a predefined implementation having the best optimization given the target IC and/or user preference. The step 506 can include a step 516, where the circuit design tool 102 incorporates selected predefined implementation(s) into the circuit design implementation, achieving an improvement in design flow runtime. The step 506 can include a step 518, where the circuit design tool 102 generates new implementation(s) for partition(s) not having matching signature(s) in the database and combines the new implementation(s) with existing predefined implementation(s). These new implementation(s) can be stored and used in a next implementation cycle of the circuit design. The step 506 can include a step 520, where the circuit design tool 102 generates new implementation(s) with different optimization(s) based on selected predefined implementation(s) for partition(s). At step 522, the circuit design tool 102 can compare the new implementation(s) with predefined implementation(s) and select the most optimal implementation, achieving an improvement in QOR. These new implementation(s) can be stored and used in a next implementation cycle of the circuit design.

Figure 6:
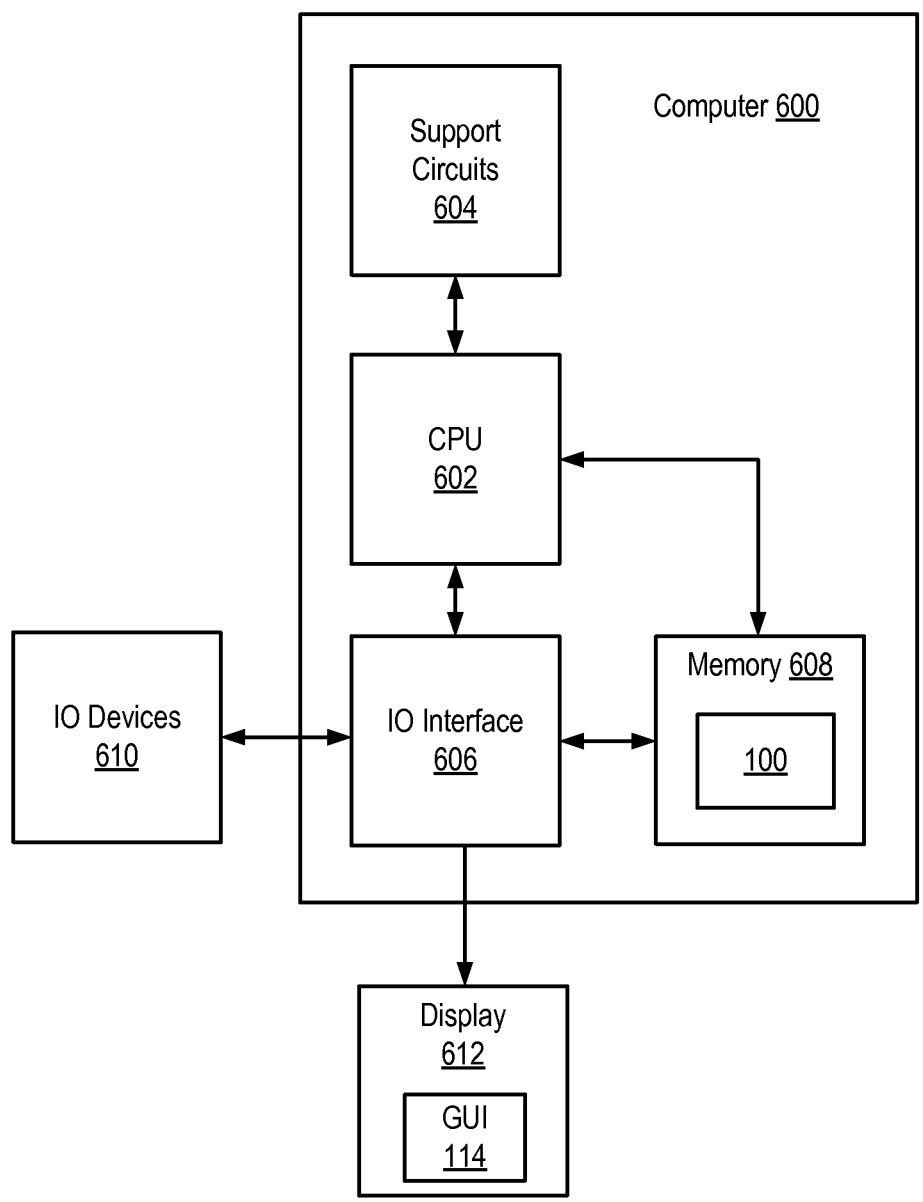
FIG. 6 is a block diagram depicting a computer suitable for implementing the methods and systems described herein.

FIG. 6 is a block diagram depicting a computer 600 suitable for implementing the methods and systems described herein. The computer 600 includes a central processing unit (CPU) 602, a memory 608, various support circuits 604, and an IO interface 606. The CPU 602 can include one or more microprocessors. The support circuits 604 can include conventional cache, power supplies, clock circuits, data registers, IO interfaces, and the like. The IO interface 606 may be directly coupled to the memory 608 or coupled through the CPU 602. The IO interface 606 can be coupled to various IO devices 610, such as conventional keyboard, mouse, printer, and the like, as well as a display 612. The display 612 can be used to present a GUI, such as the GUI 114.

The memory 608 may store all or portions of one or more programs and/or data to implement the systems and methods described herein. For example, the memory 608 can store programs for implementing the circuit design system 100 of FIG. 1. The memory 608 can include one or more of random access memory (RAM), read only memory (ROM), magnetic read/write memory, and the like.

Figure 7:
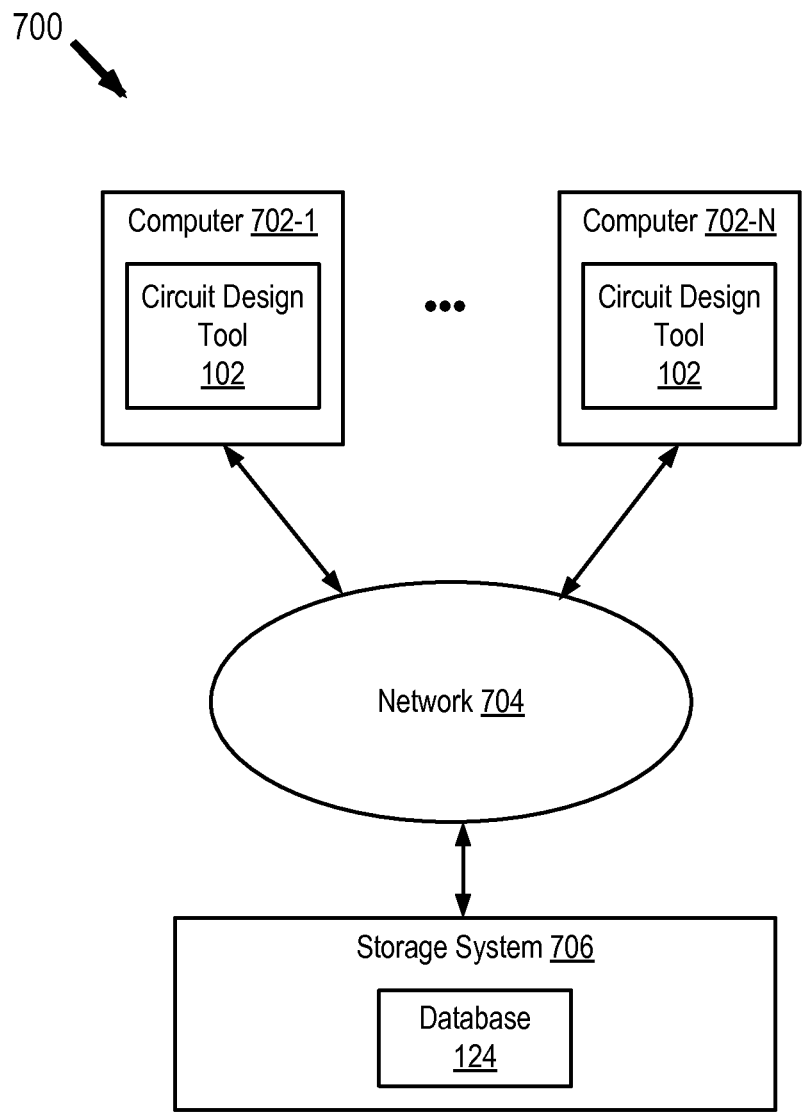
FIG. 7 is a block diagram depicting an example circuit design system according.

FIG. 7 is a block diagram depicting an example circuit design system 700. The circuit design system 700 includes computers 702-1 through 702-N, where N is an integer greater than zero (collectively computers 702). Each of the computers 702 includes a circuit design system 100 therein. Each of the computers 702 can be configured similar to the computer 600 shown in FIG. 6. The computers 702 can access a storage system 706 through a network 704. The storage system 706 can store the database 124 described above. In this manner, multiple users and multiple instances of a circuit design tool can access a common database 124 of predefined implementations. In an example, the storage system 706 can be managed by a single entity (e.g., Company XYZ provides a central database of predefined implementations accessible by a plurality of users). In another example, the storage system 706 can be managed by a third-party, such as a vendor of target ICs and/or the circuit design system 100 (e.g., a vendor provides a central database of predefined implementations accessible by its customers).

The various examples described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific examples, other and further examples may be devised without departing from the basic scope thereof, and the scope thereof is determined by the claims that follow.

What is claimed is:

1. A method of processing a circuit design, comprising:
   determining a first partition in a description of the circuit design having a hierarchy of design objects, the first partition including at least one design object in the hierarchy of design objects;
   generating a signature for the first partition using a hash function, the signature being a hash value generated by the hash function based on input of parameter values and a circuit design language description of one or more design objects of the first partition;
   querying a database, which includes entries that relate signatures to predefined implementations, with the signature of the first partition to identify a plurality of predefined implementations of the first partition; and
   generating an implementation of the circuit design for a target integrated circuit (IC) based on a selected predefined implementation of the plurality of predefined implementations for the first partition.

2. The method of claim 1, wherein determining the first partition comprises determining that the at least one design object of the first partition satisfies partition criteria.

3. The method of claim 2, wherein the partition criteria include at least one of a threshold number of instances, a threshold size, or a threshold level of dependence.

4. The method of claim 1, wherein determining the first partition comprises defining the first partition for a design object comprising an intellectual property (IP) core.

5. The method of claim 1, wherein generating the implementation comprises:
   generating a new implementation for a second partition of the circuit design having a new signature that is not stored in the database; and
   combining the new implementation of the second partition with the selected predefined implementation of the first partition.

6. The method of claim 1, wherein generating the implementation comprises incorporating the selected predefined implementation into the implementation.

7. The method of claim 1, wherein generating the implementation comprises generating a new implementation of the first partition based on the selected predefined implementation, the new implementation having a different optimization than the selected predefined implementation.

8. The method of claim 7, further comprising:
   selecting an optimal implementation from the new implementation and the selected predefined implementation; and
   storing, in the database, the new implementation of the first partition in association with the signature of the first partition.

9. The method of claim 1, wherein each of the plurality of predefined implementations of the first partition includes a different optimization.

10. The method of claim 1, wherein each of the plurality of predefined implementations for the first partition comprises a netlist synthesized for the target IC.

11. The method of claim 1, wherein:
    the target IC comprises a programmable IC; and
    each of the plurality of predefined implementations for the first partition comprises a netlist mapped, placed, and routed for the programmable IC.

12. The method of claim 1, further comprising:
    storing in the database, in response to the implementation generated for the circuit design, a new implementation for each of at least one additional partition of the circuit design in association with a new signature thereof.

13. A non-transitory computer readable medium comprising instructions, which when executed in a computer system, causes the computer system to carry out a method of processing a circuit design, comprising:
    determining a first partition in a description of the circuit design having a hierarchy of design objects, the first partition including at least one design object in the hierarchy of design objects;
    generating a signature for the first partition using a hash function, the signature being a hash value generated by the hash function based on input of parameter values and a circuit design language description of one or more design objects of the first partition;
    querying a database, which includes entries that relate signatures to predefined implementations, with the signature of the first partition to identify a plurality of predefined implementations of the first partition; and
    generating an implementation of the circuit design for a target integrated circuit (IC) based on a selected predefined implementation of the plurality of predefined implementations for the first partition.

14. The non-transitory computer readable medium of claim 13, wherein generating the implementation comprises:
    generating a new implementation for a second partition of the circuit design having a new signature that is not stored in the database; and
    combining the new implementation of the second partition with the selected predefined implementation of the first partition.

15. The non-transitory computer readable medium of claim 13, wherein generating the implementation comprises generating a new implementation of the first partition based on the selected predefined implementation, the new implementation having a different optimization than the selected predefined implementation.

16. A computer system including a circuit design tool executing therein to process a circuit design, comprising:
    a memory to store a database having predefined implementations associated with signatures; and
    a processor, executing the circuit design tool, programmed to:
      determine a first partition in a description of the circuit design having a hierarchy of design objects, the first partition including at least one design object in the hierarchy of design objects;
      generate a signature for the first partition using a hash function, the signature being a hash value generated by the hash function based on input of parameter values and a circuit design language description of one or more design objects of the first partition;
      query the database, which includes entries that relate signatures to predefined implementations, with the signature of the first partition to identify a plurality of predefined implementations of the first partition; and
      generate an implementation of the circuit design for a target integrated circuit (IC) based on a selected predefined implementation of the plurality of predefined implementations for the first partition.

17. The computer system of claim 16, wherein the processor is further programmed to:

generate a new implementation for a second partition of the circuit design having a new signature that is not stored in the database; and combine the new implementation of the second partition with the selected predefined implementation of the first partition.

18. The computer system of claim 16, wherein the processor is further programmed to generate a new implementation of the first partition based on the selected predefined implementation, the new implementation having a different optimization than the selected predefined implementation.

19. The computer system of claim 16, wherein the processor is further programmed to incorporate the selected predefined implementation into the implementation.

* * * * *